(12) United States Patent
Hu

(10) Patent No.: US 8,601,107 B2
(45) Date of Patent: Dec. 3, 2013

(54) METHOD AND APPARATUS FOR ENABLING A SERVICE-AWARE MOBILE CORE NETWORK

(75) Inventor: Q. James Hu, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 221 days.

(21) Appl. No.: 12/698,106

(22) Filed: Feb. 1, 2010

(65) Prior Publication Data

US 2011/0191452 A1    Aug. 4, 2011

(51) Int. Cl.
  *G06F 15/173*    (2006.01)
(52) U.S. Cl.
  USPC .............. 709/223; 455/452.2; 455/414.1; 379/93.01

(58) Field of Classification Search
  USPC .......................................... 709/223
  See application file for complete search history.

(56) References Cited

U.S. PATENT DOCUMENTS

| | | | |
|---|---|---|---|
| 2002/0199203 A1* | 12/2002 | Duffy et al. | 725/109 |
| 2004/0248583 A1* | 12/2004 | Satt et al. | 455/452.2 |
| 2007/0066286 A1* | 3/2007 | Hurtta | 455/414.1 |
| 2008/0095339 A1* | 4/2008 | Elliott et al. | 379/93.01 |

* cited by examiner

*Primary Examiner* — Yves Dalencourt

(57) ABSTRACT

A method and apparatus for enabling a service-aware mobile core network are disclosed. In one embodiment, a method for managing integrated services in a communication network includes detecting a first Internet protocol flow in the network, mapping the internet protocol flow to an integrated service, and managing the integrated service, including the first internet protocol flow, according to at least one policy defined for the integrated service.

18 Claims, 3 Drawing Sheets

200

| SERVICE | ASSOCIATED IP FLOWS |
|---|---|
| SERVICE 1 | FLOW A + FLOW B + FLOW C |
| SERVICE 2 | FLOW D + FLOW E |
| SERVICE 3 | FLOW F + FLOW G + FLOW H + FLOW I |
| ⋮ | ⋮ |
| SERVICE N | FLOW X + FLOW Y + FLOW Z |

METHOD AND APPARATUS FOR ENABLING A SERVICE-AWARE MOBILE CORE NETWORK

FIELD OF THE DISCLOSURE

The present disclosure relates generally to mobile communications and relates more particularly to management of integrated services in mobile communication networks.

Currently, policy and charging control (PCC) according to the $3^{rd}$ Generation Partnership Project (3GPP) manages mobile traffic according to Internet Protocol (IP) flows. However, mobile services are quickly becoming more integrated, such that a single service may comprise multiple IP flows.

For example, User A and User B may be engaged in a phone call when User A decides to send User B a photo or video. In this case, User A will require a live video link in order to communicate with User B as desired. A service agreement (i.e., a set of policies) with his service provider will define User A's subscription by type of services, as opposed to type of IP flow.

As another example, a service may need to be tied to a particular packet data network gateway (PDN-GW), such as a secure connection or a corporate connection. This ensures that when the service is identified by the deep packet inspection (DPI) mechanism, the associated packets are delivered to the proper PDN-GW as services rather than individual IP flows.

SUMMARY

In one embodiment, the present disclosure is a method and apparatus for enabling a service-aware mobile core network. In one embodiment, a method for managing integrated services in a communication network includes detecting a first internet protocol flow in the network, mapping the first internet protocol flow to a first integrated service, and managing the first integrated service, including the first internet protocol flow, according to at least one policy defined for the first integrated service.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for enabling a service-aware mobile core network. Embodiments of the disclosure provide a mechanism that links a network with service information and vice versa. The integrated mobile core network is thus service- and application-aware. In one embodiment, this is achieved by providing a policy-enabled matching mechanism, such as a lookup table, that can be deployed using a standard mechanism.

Figure 1:
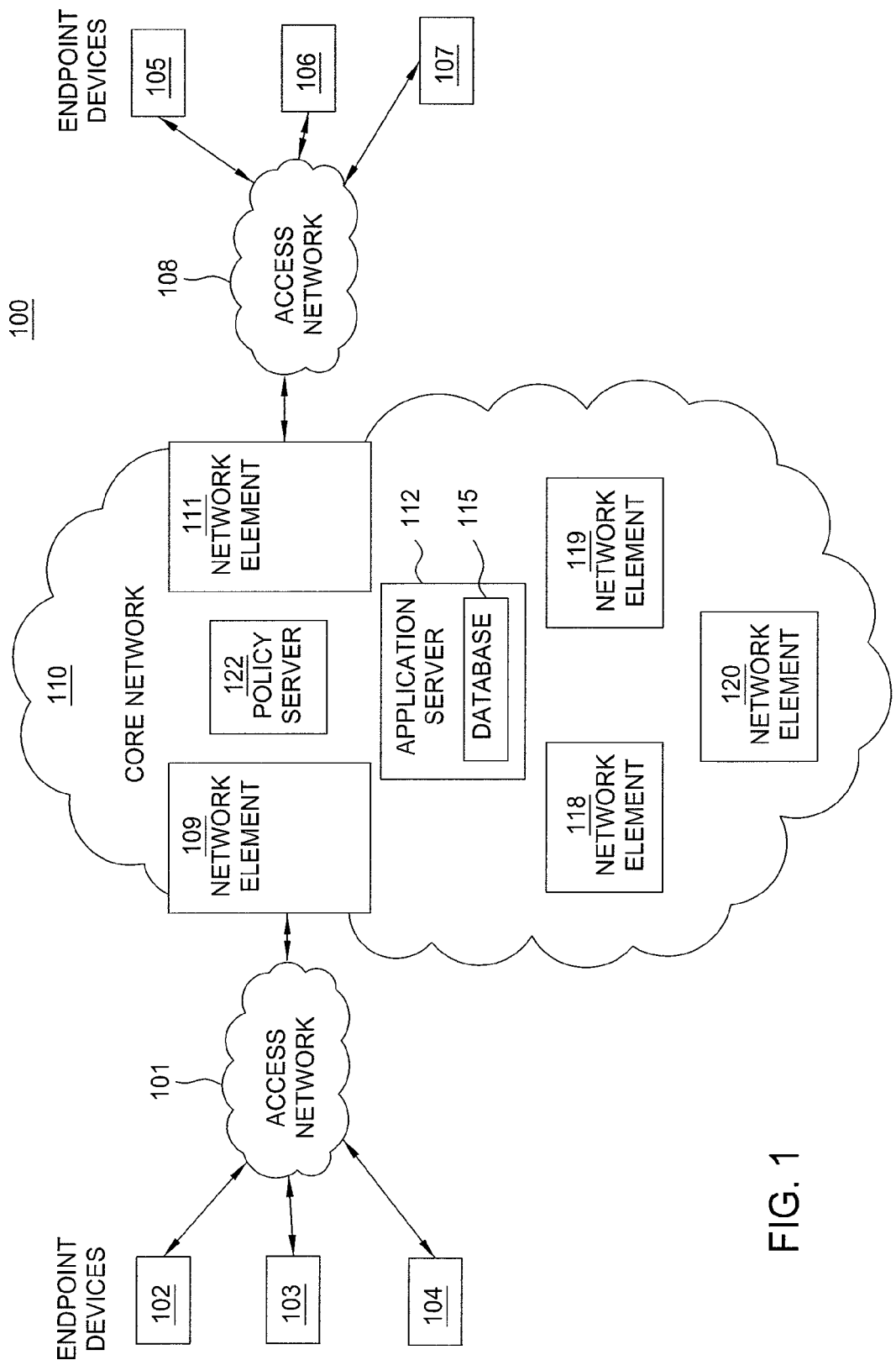
FIG. 1 is a block diagram illustrating an exemplary packet network, configured according to embodiments of the current disclosure.

FIG. 1 is a block diagram illustrating an exemplary packet network 100, configured according to embodiments of the current disclosure. Exemplary packet networks include Internet protocol (IP) networks, Ethernet networks, and the like. An IP network is broadly defined as a network that uses Internet Protocol such as IPv4 or IPv6 to exchange data packets.

In one embodiment, a first plurality of endpoint devices 102-104 reside outside the packet network and are configured for communication with the core packet network 110 (e.g., an IP-based core backbone network) via a first access network 101. Similarly, a second plurality of endpoint devices 105-107 reside outside the packet network and are configured for communication with the core packet network 110 via a second access network 108.

The network elements (NEs) 109-120 may serve as gateway servers or edge routers for the core packet network 110. In one embodiment, the first and second plurality of endpoint devices 102-104 and 105-107 comprise ISDN private branch exchanges (PBXs), automatic call distributors (ACDs), or ISDN telephones. In one embodiment, the first and second access networks 101 and 108 are time division multiplex (TDM) networks.

The endpoint devices 102-107 may comprise customer endpoint devices such as personal computers, laptop computers, Personal Digital Assistants (PDAs), landline telephones, cellular telephones, servers, routers, and the like. In one embodiment, at least some of the endpoint devices 102-107 are ISDN telephones. The first and second access networks 101 and 108 serve as a means to establish a connection between the endpoint devices 102-107 and the NEs 109 and 111 of the core packet network 110. Thus, the endpoint devices 102-107 are outside of the access networks 101 and 108 and the core packet network 110. The first and second access networks 101 and 108 may each comprise a Digital Subscriber Line (DSL) network, a broadband cable access network, a Local Area Network (LAN), a Wireless Access Network (WAN), a third party network, and the like. The first and second access networks 101 and 108 may be either directly connected to NEs 109 and 111 of the core packet network 110, or indirectly through another network.

Some NEs (e.g., NEs 109 and 111) reside at the edge of the packet network 110 and interface with customer endpoint devices 102-107 over various types of access networks (e.g., first and second access networks 101 and 108). An NE that resides at the edge of a core infrastructure is typically implemented as an edge router, a media gateway, a border element, a firewall, a switch, or the like. An NE may also reside within the network (e.g., NEs 118-120) and may be used as a mail server, a router, or a like device. The core packet network 110 also comprises an application server 112 that contains a database 115. The application server 112 may comprise any server or computer that is well known in the art, and the database 115 may be any type of electronic collection of data that is also well known in the art. In one embodiment, the application server supports a plurality of integrated services, discussed in further detail below. Those skilled in the art will realize that although only six endpoint devices 102-107, two access networks 101 and 108, and so on are depicted in FIG. 1, the packet network 100 may be expanded by including additional endpoint devices, access networks, border elements, etc. without altering the present disclosure.

The core packet network 110 further includes a policy server 122. The policy server 122 provides authorization services and facilitates tracking and control of files in the core packet network 110. The policy server 122 accepts access control requests, processes them against a formal set of statements (a "policy") that define how the core packet network's resources are to be allocated among its clients (endpoint devices 102-107), and returns access control responses. The policy server 122 maintains (e.g., stores and updates) and enforces these polices. In one embodiment, the policy server 110 also maintains a lookup table that maps IP flows to common integrated services (e.g., video conferencing applications, gaming applications, social networking applications, etc.).

Figures 2, 3:
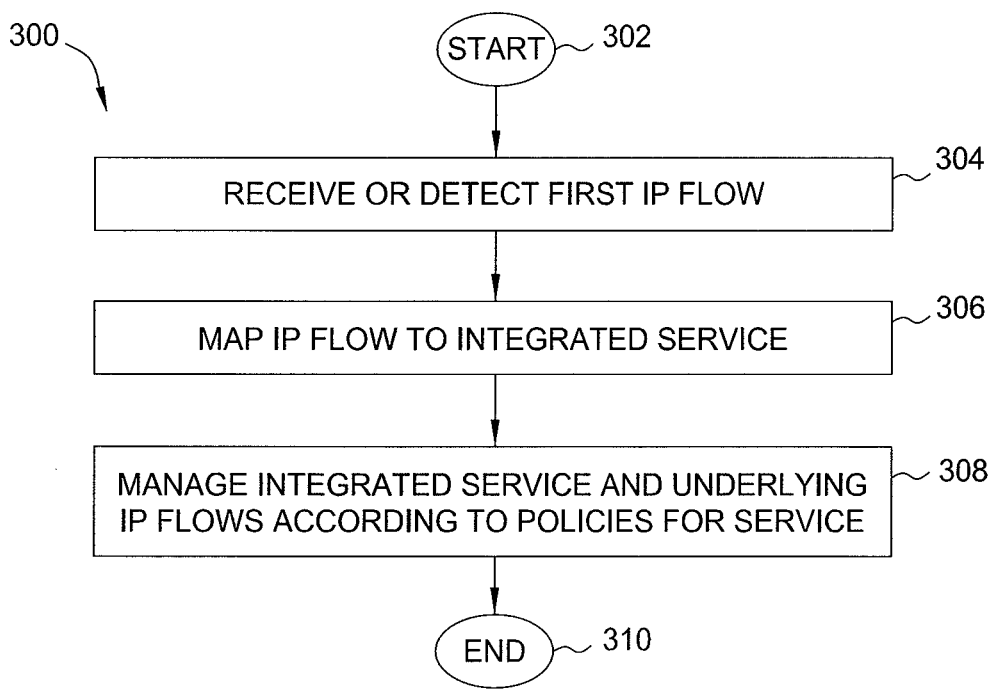
FIG. 2, for example, is an exemplary lookup table such as that which is maintained by the policy server.
FIG. 3 is a flow diagram illustrating one embodiment of a method for managing an integrated service, according to the present disclosure.

FIG. 2, for example, is an exemplary lookup table 200 such as that which is maintained by the policy server 122. As illustrated, the lookup table 200 maps a plurality of common integrated services (e.g., Service 1, Service 2, Service 3, ..., Service N) to the respective underlying IP flows (Flow A, Flow B, Flow C, ..., Flow Z) that are required to support the integrated services. For example, a conferencing service might comprise the following IP flows: a voice call, live streaming, and a whiteboard session.

In one embodiment, the integrated services are identified in the lookup table 200 using unique identifiers. The IP flows are defined by their network characteristics. Each of the IP flows may have standardized flow characteristics and quality of service (QoS) mapping, but aggregation of these IP flows that constitute integrated services may have different characteristics.

FIG. 3 is a flow diagram illustrating one embodiment of a method 300 for managing an integrated service, according to the present disclosure. The method 300 may be implemented, for example, at the policy server 122 of FIG. 1. As such, discussion of the method 300 refers to various elements of the packet network 100. It will be appreciated, however, that application of the method 300 is not limited to the packet network 100. The method 300 may, in fact, have application in networks having configurations that deviate from the configuration of the packet network 100.

The method 300 is initialized in step 302 and proceeds to step 304, where the policy server 122 receives or detects a first IP flow. The first IP flow may be, for example, a voice call. In step 306, the policy server 122 maps the first IP flow to an integrated service using a matching mechanism such as the lookup table 200 illustrated in FIG. 2. For example, the matching mechanism may map the first IP flow to an integrated service such as a conferencing application. In one embodiment, mapping the first IP flow to an integrated service includes associating the first IP flow with one or more other IP flows that support the integrated service. Thus, for example, mapping a voice call to a conferencing service might also include associating the voice call with live streaming and a whiteboard session.

In step 308, the policy server 122 manages the integrated service to which the first IP flow has been mapped (including all of the underlying IP flows), according to the policies defined for the service. For example, the policy server 122 may define one or more policies that govern the management of a conferencing service. The method 300 then terminates in step 310.

The present disclosure therefore creates an explicit link between integrated services and the network that provides them. New integrated services can be created and defined based on different combinations of underlying IP flows. The network's policy framework then acts and enforces policies on the services rather than on the individual IP flows that support the services. This greatly simplifies the management of integrated services in long-term evolution networks. It also facilitates and simplifies the management of roaming services and applications.

Figure 4:
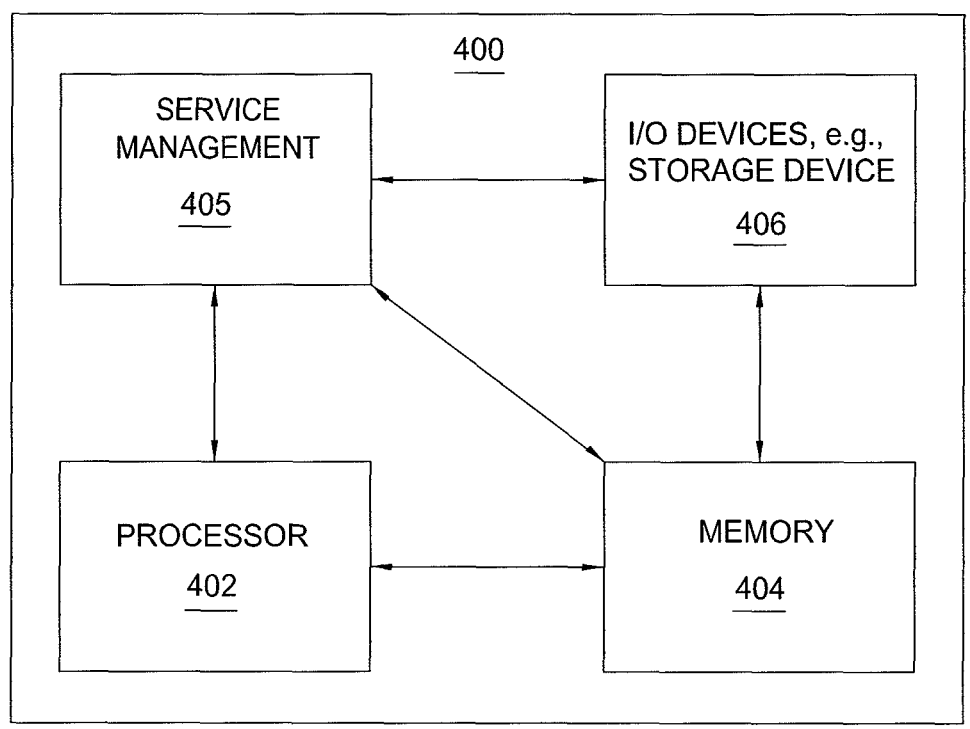
FIG. 4 is a high level block diagram of the integrated service management method that is implemented using a general purpose computing device.

FIG. 4 is a high level block diagram of the integrated service management method that is implemented using a general purpose computing device 400. The general purpose computing device 400 may be part of a media gateway, for example. In one embodiment, a general purpose computing device 400 comprises a processor 402, a memory 404, a service management module 405 and various input/output (I/O) devices 406 such as a display, a keyboard, a mouse, a modem, a stylus, a joystick, a keypad, controller, a network interface, and the like. In one embodiment, at least one I/O device is a storage device (e.g., a disk drive, an optical disk drive, a floppy disk drive). It should be understood that the service management module 405 can be implemented as a physical device or subsystem that is coupled to a processor through a communication channel.

Alternatively, the service management module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the service management module 405 for management of integrated services described herein with reference to the preceding Figures can be stored on a non-transitory computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing integrated services in a communication network, comprising:
   detecting, via a processor, a first internet protocol flow in the communication network;
   mapping, via the processor, the first internet protocol flow to a first integrated service, wherein the first integrated service comprises a plurality of internet protocol flows, wherein each of the plurality of internet protocol flows has a different quality of service mapping; and
   managing, via the processor, the first integrated service according to a policy defined for the first integrated service, wherein the managing comprises managing all internet protocol flows associated with the first integrated service, including the first internet protocol flow, according to the policy and not to the different quality of service mapping of each one of the plurality of internet protocol flows.

2. The method of claim 1, wherein the mapping comprises:
   associating the first internet protocol flow with the first integrated service in a lookup table.

3. The method of claim 2, wherein the lookup table identifies:
   a plurality of integrated services, including the first integrated service; and
   for each of the plurality of integrated services, an underlying internet protocol flow.

4. The method of claim 3, wherein each of the plurality of integrated services is identified in the lookup table according to a unique identifier.

5. The method of claim 3, wherein each of the underlying internet protocol flow is defined by an associated network characteristic.

6. The method of claim 2, wherein the mapping further comprises:
   associating the first internet protocol flow with another internet protocol flow that is associated with the first integrated service in the lookup table.

7. The method of claim 2, wherein the lookup table is maintained by a policy server that enforces the policy.

8. The method of claim 1, wherein the first internet protocol flow supports the first integrated service.

9. A non-transitory computer readable medium storing a plurality of instructions which, when executed by a processor, cause the processor to perform operations for managing integrated services in a communication network, the operations comprising:
   detecting a first internet protocol flow in the communication network;
   mapping the first internet protocol flow to a first integrated service, wherein the first integrated service comprises a plurality of internet protocol flows, wherein each of the plurality of internet protocol flows has a different quality of service mapping; and
   managing the first integrated service, including the first internet protocol flow, according to a policy defined for the first integrated service, wherein the managing comprises managing all internet protocol flows associated with the first integrated service, including the first internet protocol flow, according to the policy and not to the different quality of service mapping of each one of the plurality of internet protocol flows.

10. The non-transitory computer readable medium of claim 9, wherein the mapping comprises:
    associating the first internet protocol flow with the first integrated service in a lookup table.

11. The non-transitory computer readable medium of claim 10, wherein the lookup table identifies:
    a plurality of integrated services, including the first integrated service; and
    for each of the plurality of integrated services, an underlying internet protocol flow.

12. The non-transitory computer readable medium of claim 11, wherein each of the plurality of integrated services is identified in the lookup table according to a unique identifier.

13. The non-transitory computer readable medium of claim 11, wherein each of the underlying internet protocol flow is defined by an associated network characteristic.

14. The non-transitory computer readable medium of claim 10, wherein the mapping further comprises:
    associating the first internet protocol flow with another internet protocol flow that is associated with the first integrated service in the lookup table.

15. The non-transitory computer readable medium of claim 10, wherein the lookup table is maintained by a policy server that enforces the policy.

16. The non-transitory computer readable medium of claim 9, wherein the first internet protocol flow supports the first integrated service.

17. An apparatus for managing integrated services in a communication network, comprising:
    a processor; and
    a non-transitory computer-readable medium storing a plurality of instructions which, when executed by the processor, cause the processor to perform operations, the operations comprising:
       detecting a first internet protocol flow in the communication network;
       mapping the first internet protocol flow to a first integrated service, wherein the first integrated service comprises a plurality of internet protocol flows, wherein each of the plurality of internet protocol flows has a different quality of service mapping; and
       managing the first integrated service according to a policy defined for the first integrated service, wherein the managing comprises managing all internet protocol flows associated with the first integrated service, including the first internet protocol flow, according to the policy and not to the different quality of service mapping of each one of the plurality of internet protocol flows.

18. The apparatus of claim 17, wherein the mapping comprises:
    associating the first internet protocol flow with the first integrated service in a lookup table.

* * * * *